(12) United States Patent
Nelson et al.

(10) Patent No.: US 7,512,115 B2
(45) Date of Patent: *Mar. 31, 2009

(54) TELEPHONE-BASED HYPERTEXT TRANSPORT PROTOCOL SERVER

(75) Inventors: Mark R. Nelson, Plano, TX (US); Richard B. Platt, Allen, TX (US)

(73) Assignee: Cisco Technology, Inc., San Jose, CA (US)

( * ) Notice: Subject to any disclaimer, the term of this patent is extended or adjusted under 35 U.S.C. 154(b) by 987 days.

This patent is subject to a terminal disclaimer.

(21) Appl. No.: 10/621,436

(22) Filed: Jul. 16, 2003

(65) Prior Publication Data

US 2004/0246946 A1 Dec. 9, 2004

Related U.S. Application Data

(63) Continuation of application No. 09/411,426, filed on Sep. 30, 1999, now Pat. No. 6,628,644.

(51) Int. Cl.
*H04L 12/66* (2006.01)

(52) U.S. Cl. .................................. 370/352; 370/356

(58) Field of Classification Search ................ None
See application file for complete search history.

(56) References Cited

U.S. PATENT DOCUMENTS

| 5,812,776 | A | | 9/1998 | Gifford | 395/200.47 |
| 5,923,736 | A | * | 7/1999 | Shachar | 379/93.17 |
| 5,991,291 | A | | 11/1999 | Asai et al. | 370/352 |
| 6,173,316 | B1 | | 1/2001 | De Boor et al. | 709/218 |
| 6,188,875 | B1 | | 2/2001 | Evans | 455/15 |
| 6,285,683 | B1 | | 9/2001 | Lin | 370/466 |
| 6,338,085 | B1 | | 1/2002 | Ramaswamy | 709/217 |
| 6,345,047 | B1 | * | 2/2002 | Regnier | 370/352 |
| 6,385,191 | B1 | | 5/2002 | Coffman et al. | 370/352 |
| 6,389,124 | B1 | | 5/2002 | Schnarel et al. | 379/142.01 |
| 6,396,849 | B1 | * | 5/2002 | Sarkissian et al. | 370/490 |
| 6,424,647 | B1 | | 7/2002 | Ng et al. | 370/352 |
| 6,430,174 | B1 | * | 8/2002 | Jennings et al. | 370/352 |
| 6,449,269 | B1 | * | 9/2002 | Edholm | 370/352 |
| 6,584,096 | B1 | * | 6/2003 | Allan | 370/352 |
| 6,791,974 | B1 | * | 9/2004 | Greenberg | 370/352 |
| 2001/0033564 | A1 | * | 10/2001 | Hickman | 370/352 |
| 2001/0043594 | A1 | * | 11/2001 | Ogawa et al. | 370/356 |

OTHER PUBLICATIONS

Cisco Systems, Inc.; "System Description for the Cisco Communications Network Version 2.1;" Cisco Communications Network; all.

* cited by examiner

*Primary Examiner*—Wing F Chan
*Assistant Examiner*—Anthony Sol
(74) *Attorney, Agent, or Firm*—Baker Botts L.L.P.

(57) ABSTRACT

A telephone is provided for delivering content to a client that is coupled to a communications network. The telephone includes a processor and a network interface operable to couple the telephone to the communications network. The telephone also includes a handset operable to provide oral communication by a user of the telephone using the network interface. Furthermore, the telephone includes a memory that is coupled to the processor and operable to store content for delivery to the client using the network interface. The content that is stored is associated with the operation of the telephone. In a particular embodiment, the client to which the content is delivered is a Web browser, and the content is at least one HyperText Markup Language document to be displayed in the Web browser.

15 Claims, 7 Drawing Sheets

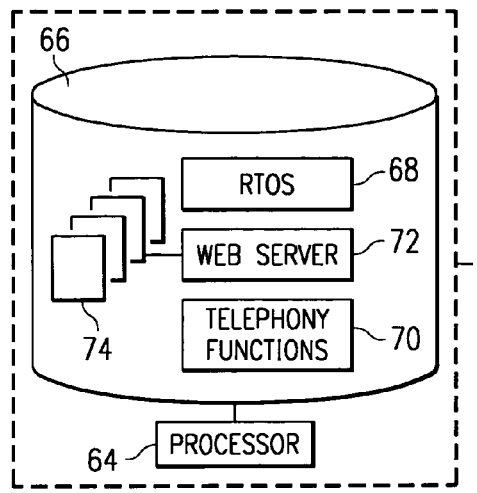
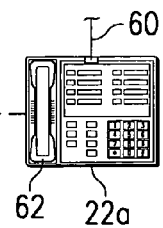
FIG. 2
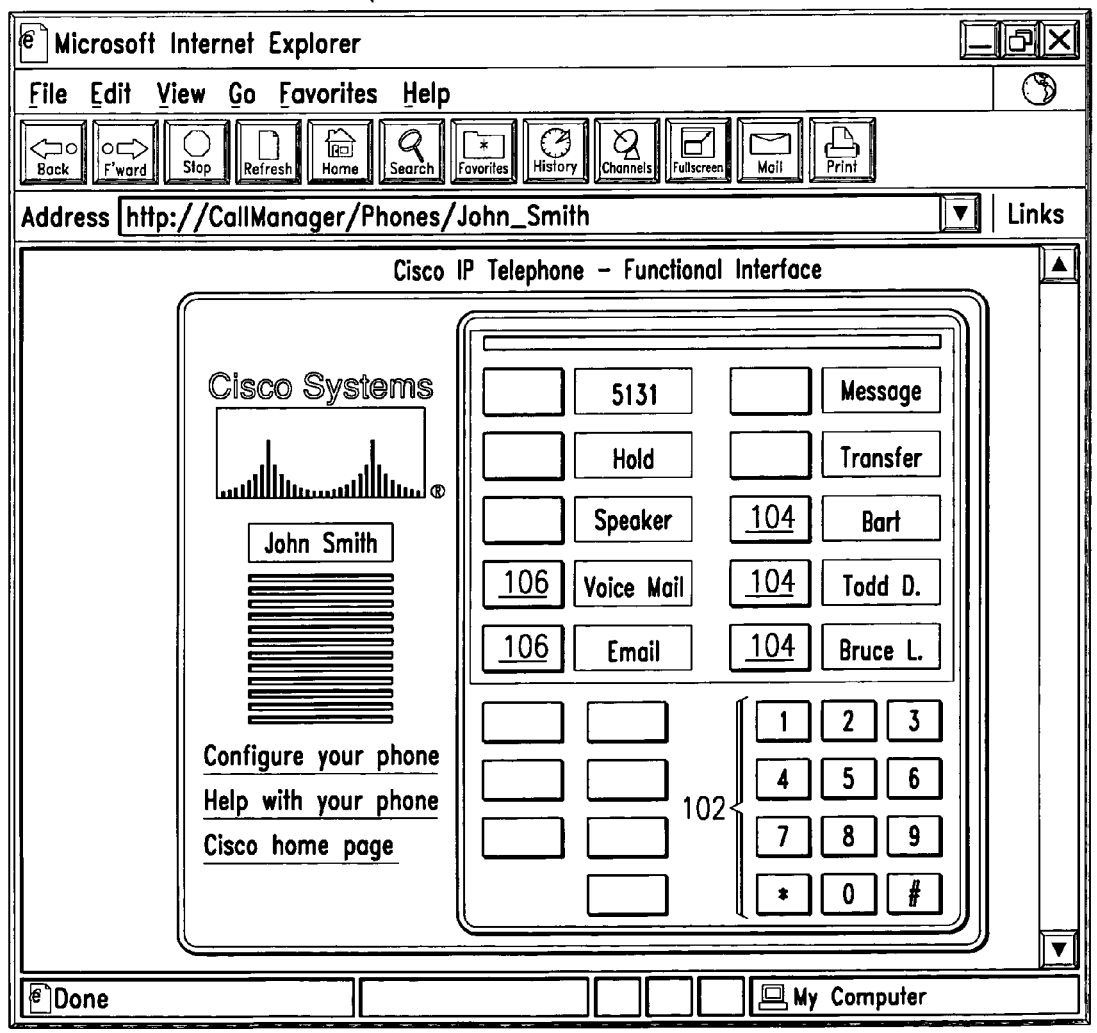
FIG. 3

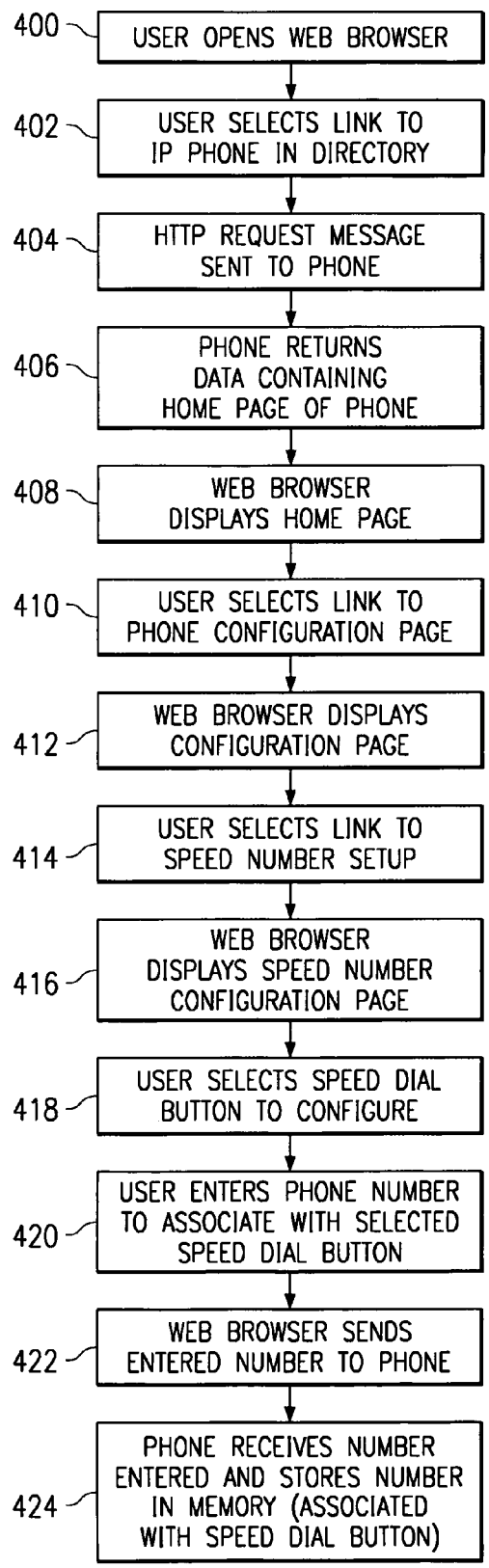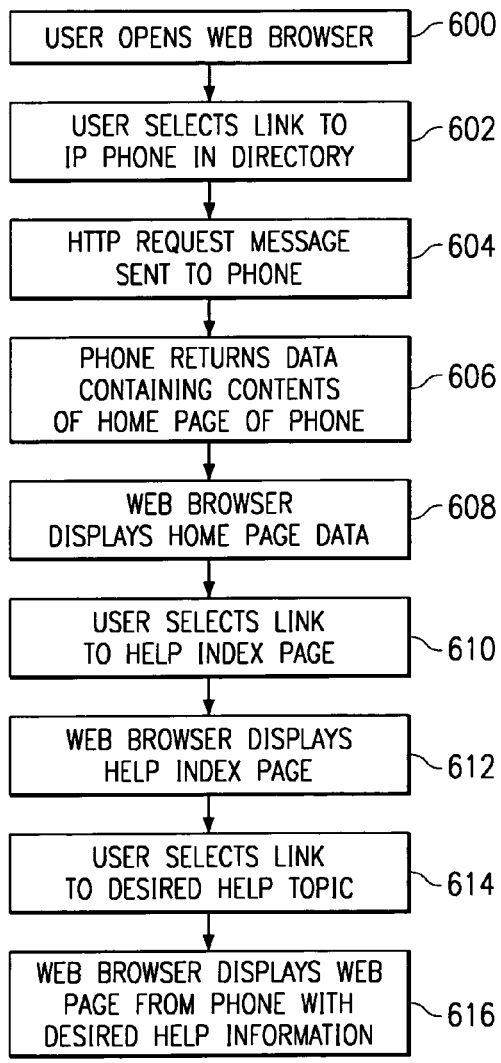

TELEPHONE-BASED HYPERTEXT TRANSPORT PROTOCOL SERVER

CROSS-REFERENCE TO RELATED APPLICATION

This application is a continuation of U.S. application Ser. No. 09/411,426 filed Sep. 30, 1999 now U.S. Pat. No. 6,628,644 and entitled "Telephone-Based Hypertext Transport Protocol Server".

TECHNICAL FIELD OF THE INVENTION

This invention relates generally to the field of Internet Protocol telephony, and more specifically to a telephone-based HyperText Transport Protocol server.

BACKGROUND OF THE INVENTION

The creation of the World Wide Web was the catalytic event that has led to today's explosive growth of the Internet. The ability to present information to users in an attractive and user-friendly fashion took the Internet out of the lab and brought it to the desktop and into the home. The Web has become the most popular method of interacting with remote computers on the Internet, and is fast becoming the interface of choice for many other computer applications. Although Web pages are typically downloaded from servers on the Internet, Web pages may also be delivered over a local area network, typically referred to as an intranet. In addition to their use in transmitting and receiving Web pages, the Internet and local area networks have also recently begun to be used for telecommunications. Such telecommunications are typically referred to as Internet telephony or Internet Protocol (IP) telephony.

SUMMARY OF THE INVENTION

In accordance with the present invention, a telephone-based HyperText Transport Protocol server is provided that provides greater functionality and ease of use for telephones coupled to an Internet Protocol network.

According to one aspect of the present invention, a telephone is provided for delivering content to a client that is coupled to a communications network. The telephone includes a processor and a network interface operable to couple the telephone to the communications network. The telephone also includes a handset operable to provide oral communication by a user of the telephone using the network interface. Furthermore, the telephone includes a memory that is coupled to the processor and operable to store content for delivery to the client using the network interface. The content that is stored is associated with the operation of the telephone.

According to another aspect of the present invention, a method is provided for controlling a telephone from a network device, where both the telephone and the network device are coupled to a communications network. The method includes executing a graphical user interface on the network device, and selecting a link in the graphical user interface that is directed to a network address of the telephone. The method further includes transmitting a request to the telephone for data associated with the telephone, and receiving data from the telephone in response to the request. Furthermore, the method includes displaying the transmitted data in the graphical user interface, and selecting a telephone-related option from the data displayed in the graphical user interface.

Technical advantages of the present invention include an IP phone-based Web server that allows a user to interact with the phone using a Web browser. Such a Web server allows a direct functional interface with the telephone, allowing end users to control and operate most of the functions of the telephone from a Web browser. Furthermore, the browser interface to the telephone will allow end users to perform many administrative functions on the telephone, including, but not limited to assignment of speed numbers, key definitions, and IP addresses. Finally, a complete HyperText based user/help guide may be made available on the phone's Web server, or the phone may provide links to help files located on other network devices.

Other technical advantages are readily apparent to one skilled in the art from the following figures, descriptions, and claims.

BRIEF DESCRIPTION OF THE DRAWINGS

For a more complete understanding of the present invention, and for further features and advantages, reference is now made to the following description, taken in conjunction with the accompanying drawings, in which:

FIG. 2 illustrates an Internet Protocol (IP) telephony device in accordance with the present invention;

FIG. 3 illustrates an exemplary functional interface Web page in accordance with the present invention;

FIG. 7 is a flowchart illustrating an exemplary process in accordance with the present invention for configuring a speed dial button on an IP phone using a Web browser;

FIG. 9 is a flowchart illustrating an exemplary process in accordance with the present invention for receiving help information Web pages delivered by an IP phone.

DETAILED DESCRIPTION OF THE INVENTION

Figure 1:
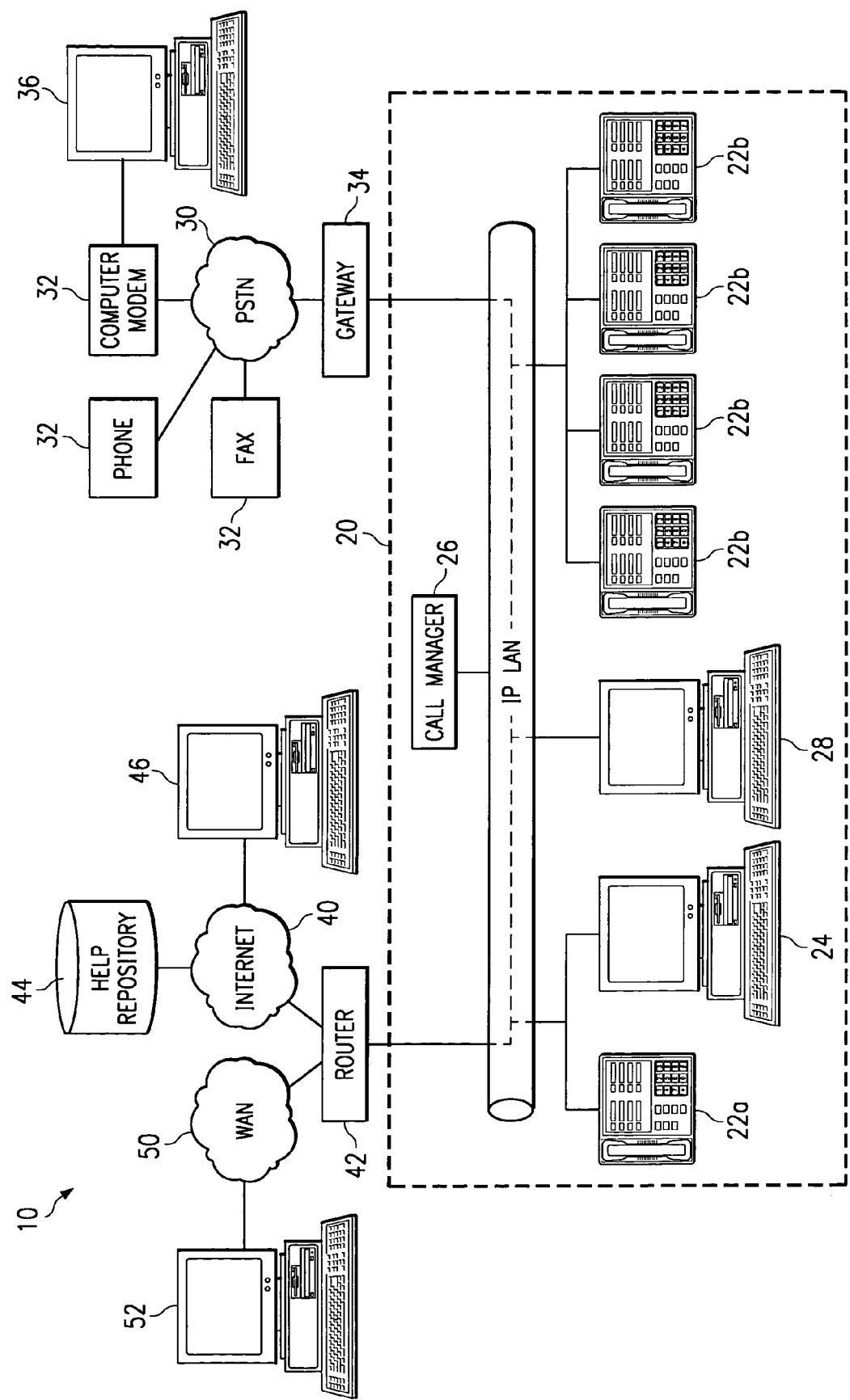
FIG. 1 illustrates an exemplary communications network in accordance with the present invention.

FIG. 1 illustrates an exemplary communications network in accordance with the present invention. Communications network 10 includes a local area network (LAN) 20 that is coupled to the Public Switched Telephone Network (PSTN) 30 to provide voice and video telecommunications over an existing data network (such as a business' Ethernet network). Such a configuration eliminates the need for a separate telephone line network (such as a private branch exchange or PBX network) to supplement LAN 20. In addition to being coupled to PSTN 30, LAN 20 may also be coupled to the Internet 40 or a private wide area network (WAN) 50 to allow access to network devices external to LAN 20.

To optimize integration with Internet 40 (which is an Internet Protocol (IP) network), LAN 20 is also preferably an IP network. However, LAN 20 may be any type of network that allows the transmission of voice telecommunications, as well as traditional data communications. IP networks transmit data (including voice data) by placing the data in packets and sending the packets individually to the selected destination. This is known as a packet-switched network. Unlike a circuit-switched network (like PSTN 30), dedicated bandwidth is not required for the duration of a call or fax transmission over LAN 20 or Internet 40. Instead, each telephony device sends packets as they are available for transmission. This feature makes bandwidth available for other data when voice or fax data is not being transmitted.

The technology that allows telephony communication over an IP network is typically referred to as Voice over IP (VoIP). IP telephony devices 22 (shown as IP telephones) are coupled to LAN 20 to allow such communication over LAN 20. IP telephony devices 22 have the capability of encapsulating a user's voice (or other inputs) into IP packets so that the voice can be transmitted over LAN 20 and/or Internet 40. IP telephony devices may include telephones, fax machines, and any other device capable of performing telephony functions over an IP network. A call manager 26 controls IP telephony devices 22. Call manager 26 is an application that controls call processing, routing, phone features and options (such as call hold, call transfer and caller ID), device configuration, and other telephony functions and parameters within communications network 10.

When a user wishes to place a call from one IP telephony device 22 to another IP telephony device 22, the calling device transmits data to call manager 26 indicating the desired function and destination. Call manager 26 then signals telephony devices 22 to establish a network connection between themselves over LAN 20. Once such a connection has been established, a codec (coder/decoder) converts the voice (or fax) signals generated by the users of devices 22 from analog voice signals into digital form. They may implement the codec either in software or as special-purpose hardware in IP telephony devices 22. In the case of an IP telephone, as the user speaks into the handset, the codec converts the analog voice signals into digital data. They then encapsulate the digitally encoded data within IP packets so that it can be transmitted over LAN 20. This encapsulation is typically performed by Real-Time Transport Protocol (RTP) running over UDP/IP (User Datagram Protocol/Internet Protocol). The encapsulation process is well-known in the art, and will not be described in further detail. The IP packets are then carried over LAN 20 via the IP protocol to the other telephony device(s) 22 participating in the call. A codec in the other telephony device 22 then translates the IP packet data into analog voice signals for presentation to the user. This process is completed each time any call participant (or any other source) generates an audio signal.

In addition to intra-LAN telephone calls, calls can also be placed to non-IP telephony devices 32 that are connected to PSTN 30. Such calls are made through a VoIP-to-PSTN gateway 34. Gateway 34 converts analog or digital circuit-switched data transmitted by PSTN 30 (or a PBX) to packet data transmitted by LAN 20, and vice-versa. Gateway 34 also translates between the VoIP call control system and the Signaling System 7 (SS7) protocols used in PSTN 30. For example, when making a call to a PSTN telephony device 32 from an IP telephony device 22, the voice or fax signal generated by the user of IP telephony device 22 is digitized and encapsulated, as described above. The packets are then transmitted over LAN 20 to gateway 34. Gateway 34 unpacks the IP packets and converts the data to the format (either digital or analog) used by the PSTN trunk to which the gateway is connected. The voice signals are then sent to the PSTN telephony device 32 over PSTN 30. This process is continued between PSTN 30 and LAN 20 through gateway 32 until the call is complete.

Finally, calls can be made between IP telephony devices 22 and other IP telephony devices located on Internet 40 or across WAN 50 in other networks. Again, the voice or fax data is digitized and encapsulated into IP packets at the telephony device. However, unlike communications with devices on PSTN 30, a gateway is not needed to convert the IP packets to another format. A router 42 (or other similar device) directs the packets to the IP address of the other IP telephony device.

Since IP telephony devices 22 are capable of transmitting and receiving data in the same encapsulated format that is used by computers and other devices on an IP network, IP telephony devices 22 have the ability to directly communicate with any other IP device coupled either directly or indirectly to LAN 20. One such communication that is possible over an IP network is the transmission and reception of World Wide Web ("Web") pages. Traditionally, the role of delivering or "serving" Web pages to other computers over an IP network has been reserved for personal computers or larger server-type computers. However, since IP telephony devices 22 are coupled to network 10, it also possible to serve Web pages from these devices.

By embedding a Web server in the firmware of an IP telephone 22*a*, users and system administrators are able to interact with the telephone using a Web browser (such as MICROSOFT INTERNET EXPLORER or NETSCAPE NAVIGATOR) loaded on a network device that is coupled to communications network 10. Network devices that may interact with IP telephone 22*a* through a web browser include, but are not limited to, LAN computers 24 and 28 (computer 24 is associated with the same user as IP telephone 22*a* serving the Web pages), other LAN telephony devices 22*b*, a computer 52 coupled to WAN 50, a computer 46 coupled to Internet 40, and a computer 36 coupled to PSTN 30 using a modem or other appropriate device. The implementation and use of a phone-based Web server will be described in greater detail below in conjunction with FIG. 2. However, a general background on the Web and Web servers will first be provided.

The Web is essentially a collection of applications and content that are stored on a Web server and delivered in the form of "pages" that are displayed in a Web client or browser. Links are typically embedded into these pages to allow connection to other Web servers around the world. The Web is based on the HyperText Transfer Protocol (HTTP), which establishes connections between Web clients and Web servers and provides a common way for clients and servers to communicate and transfer information. Web servers and content on Web servers are identified by a Uniform Resource Locator (URL) that distinguishes a particular server by its domain name (which is translated by the domain name system (DNS) to an IP address) and provides the location of a particular file in the server's file system. When a URL is entered in a browser, the browser sends an HTTP command to the Web server directing it to locate and transmit the requested Web page.

In a particular embodiment, a Web server is a computer system or other device connected to a TCP/IP-based network, running a software program that implements the HTTP protocol to exchange messages between the server and Web clients. Web servers typically operate by receiving a request from a browser in the form of a URL that specifies an already-existing HyperText Markup Language (HTML) file in the server's local file system, and responding to the request by sending the contents of that file back to the browser. HTML is a set of "markup" symbols or codes inserted in a file intended for display on a Web browser. The markup codes tell the Web browser how to display a Web page's words and images for the user.

An HTTP client (typically referred to as a Web browser) is installed as an application on a computer or other device that is connected to an IP network, either directly or indirectly to through the use of a gateway (such as an Internet Service Provider (ISP) or an on-line service, such as AMERICA ONLINE). The browser contains an HTML interpreter that knows how to display Web pages containing text, graphics, and certain other data types. The browser provides a graphical user interface through which a user can interact with other computers or devices coupled to a common network (such as the Internet). Most browsers also include other functionality to handle Internet e-mail, newsgroups, and download-only file transfer using FTP.

As mentioned above, Web servers communicate with Web browsers via HTTP. An HTTP transaction consists of the server and client sending each other messages. Each message contains a request or response statement, a header containing information about the client or server, and optionally, some quantity of data. As an example, consider a user who wishes to browse a company's home page. First, the user launches the Web browser. Then the user enters the name of the company's HTTP server and, optionally, the desired content (i.e., HTML file) on that Web server. This is done using the URL format (this entry may be performed manually by typing or by selecting a HyperText link to that URL). The Web browser parses the URL into the server name and, optionally, the content name (i.e., HTML file name). If no content name is entered, the Web server's home or index page is requested. The network protocol software contacts a Domain Name System (DNS) server to resolve the HTTP server's name into an IP address.

The Web browser then constructs an HTTP request message to send to the identified IP address. The message's request statement contains the key word 'GET', the latest version of HTTP that the browser supports, and optionally, the name and location of the requested content. The HTTP message also includes a header that describes the browser's configuration and which document and image formats the browser can understand. The message may also include authentication information. Once the request message has been constructed, the browser sends the message to the IP address via TCP/IP. The message travels over an IP network, typically the Internet, until it reaches the indicated destination.

When the server receives the message, it authenticates the browser to see whether the user has access rights to this server (for public Web sites, generally anyone is allowed access). If the user has access rights, the server searches to determine whether the requested content (or the index page, if no specific content has been requested) exists on the server. The server then constructs an HTTP response message. A response statement is located at the beginning of the message and describes the HTTP version that the response will take, as well as the status of the client's request (such as '404' meaning the requested content was not found, '401' meaning the user was not authorized for the request, or '200' meaning the request was successful and the requested data is included in the message).

The HTTP response message's header section describes the data that follows, including its content type (such as human-readable text, HTML document, graphic file, or a binary file designed to be saved on disk or to be sent to a certain plug-in extension or helper application) and the amount of data in bytes. The data itself follows the header.

Most current browsers can interpret several data formats, including plain ASCII text (to display within the browser's window), HTML text (which can include different type styles, typefaces, color, and HyperText links, as well as code to identify embedded graphics), and several common graphics file formats such as GIF and JPEG.

If the data format is not understood by the browser, the browser then will look to see whether an installed plug-in extension or helper application has registered this format as one that it supports. Examples of such plug-ins and helper applications are SHOCKWAVE, REALPLAYER, and QUICKTIME. If a plug-in or helper application is found, the browser then launches that application and passes the data to it. If there is no plug-in or helper that can process the data, the browser typically presents the user with a dialog box that informs the user that the data cannot be understood. The dialog box presents the user with the choice to save the file onto disk or to cancel the transaction.

Once the browser has received the data from the server, the user may initiate another request by "clicking" (with a mouse or other "pointing" device) on a link in the displayed Web page or by entering another URL. Since HTTP is a "stateless" protocol, a Web server does not retain any information about the history of its transactions with a given client. Therefore, whenever the client requests additional content (by "clicking" on a link or entering a URL), the process repeats.

As discussed above, since IP telephony devices 22 are directly coupled to an IP network, such as LAN 20, these devices are capable of acting as Web servers. Embedding a Web server in an IP phone provides many advantages. The Web server allows a direct functional interface with the telephone, allowing end users to control and operate most of the functions of the telephone from a Web browser. The browser interface to the telephone also allows end users to perform many administrative functions on the telephone, including, but not limited to assignment of speed numbers, key definitions, and IP addresses. Furthermore, a complete. HyperText based user/help guide may be made available on the phone's Web server, or the phone may provide links to help files located on other devices. It will be understood that although a Web server is described as being embedded in an IP phone, this concept can also be applied to any other type of network device connected to a communications network, such as communications network 10.

Referring to FIGS. 1 and 2 in combination, in communications network 10, Web servers may be located in IP telephones 22. One such IP phone 22a is detailed in FIG. 2. IP phone 22a includes a network interface 60 that receives data from and transmits data to LAN 20. Network interface 60 may be any electrical, physical, or electromagnetic connection enabling IP phone 22a to be coupled to any IP network. One example of network interface 60 is an RJ-45 interface typically used in an Ethernet network. IP phone 22a further includes a handset 62 that allows a user to transmit and receive audio signals through IP phone 22a. Handset 62 may also comprise any other device that performs this function, such as a headset, a speakerphone, or any other combination of a microphone and a speaker. IP phone further includes a keypad, and may also include several optional features such as special-use buttons (i.e., speed dial buttons) or a video, LCD, or other type of display.

IP phone 22a also includes a processor 64 and a memory 66 that is accessible by processor 64. Memory 66 may include any type of volatile or non-volatile computer memory such RAM (or its variants), Flash, ROM, PROM, EPROM, EEPROM, or any other appropriate means of storing data. Memory 66 may also include media storage devices including, but not limited to, hard drives, diskettes, CD-ROMs, DVD-ROMs, or other optical or magnetic storage devices. Memory 66 may contain operating system software or firmware, such as a real-time operating system (RTOS) 68, that is run by processor 64. An RTOS is an operating system that guarantees a certain capability within a specified time constraint, and is often used in embedded systems. Memory 66 further contains telephony software or firmware 70 that provides the various telephony functions needed to operate IP phone 22*a* and its features. Examples of these functions include network interfacing, IP tasks (e.g., a TCP/IP stack), codec, audio processing, button functions, and display functions.

Memory 66 further includes Web-related software or firmware 72 for providing the Web server function. This includes software or firmware that implements the HTTP protocol. Memory 66 also includes content 74 (i.e., Web page data) that is provided upon request by a Web client. The Web server software/firmware 72 operates to provide Web pages as described above.

In order to interface with Web server 72 in IP telephone 22*a*, a user may use a standard directory lookup feature on a browser coupled directly or indirectly to LAN 20 (such as a browser loaded on computer 24 that is utilized by the user of IP phone 22*a*). Typically this will involve the user requesting a directory page on a company Web server that provides a link to the user's IP phone 22*a*. Call manager 26 may serve such a directory page for all of the IP telephony devices 22 that it manages. Alternatively, the user may either type in a URL of the phone and rely on a name server to provide the browser with an IP address, or the user may type in the phone's IP address, if known.

In a particular embodiment, when the user first opens the index or home Web page on a given IP phone 22*a*, he or she will see a functional interface 100, as illustrated in FIG. 3. Functional interface 100 mimics the appearance of IP phone 22*a*, allowing the user to invoke most telephony features and options in the same manner as they would on the physical phone. The user is free to perform any functions that are technically possible on the computer screen. For example, the user can initiate a phone call by dialing a phone number using a keypad 102 or by pushing a speed dial button 104. Alternatively the user can check voice-mail or e-mail using the appropriate function buttons 106. Other functions that may also be performed include, but are not limited to, call answering, call transferring, call parking, conference calling, call forwarding, call holding, redialing, speed dialing, video calling, application/data sharing, and on-line chatting. Scripting languages, such as JAVASCRIPT, that interface with HTTP server 72 may also be used to interact with the functionality of the phone.

Figure 4:
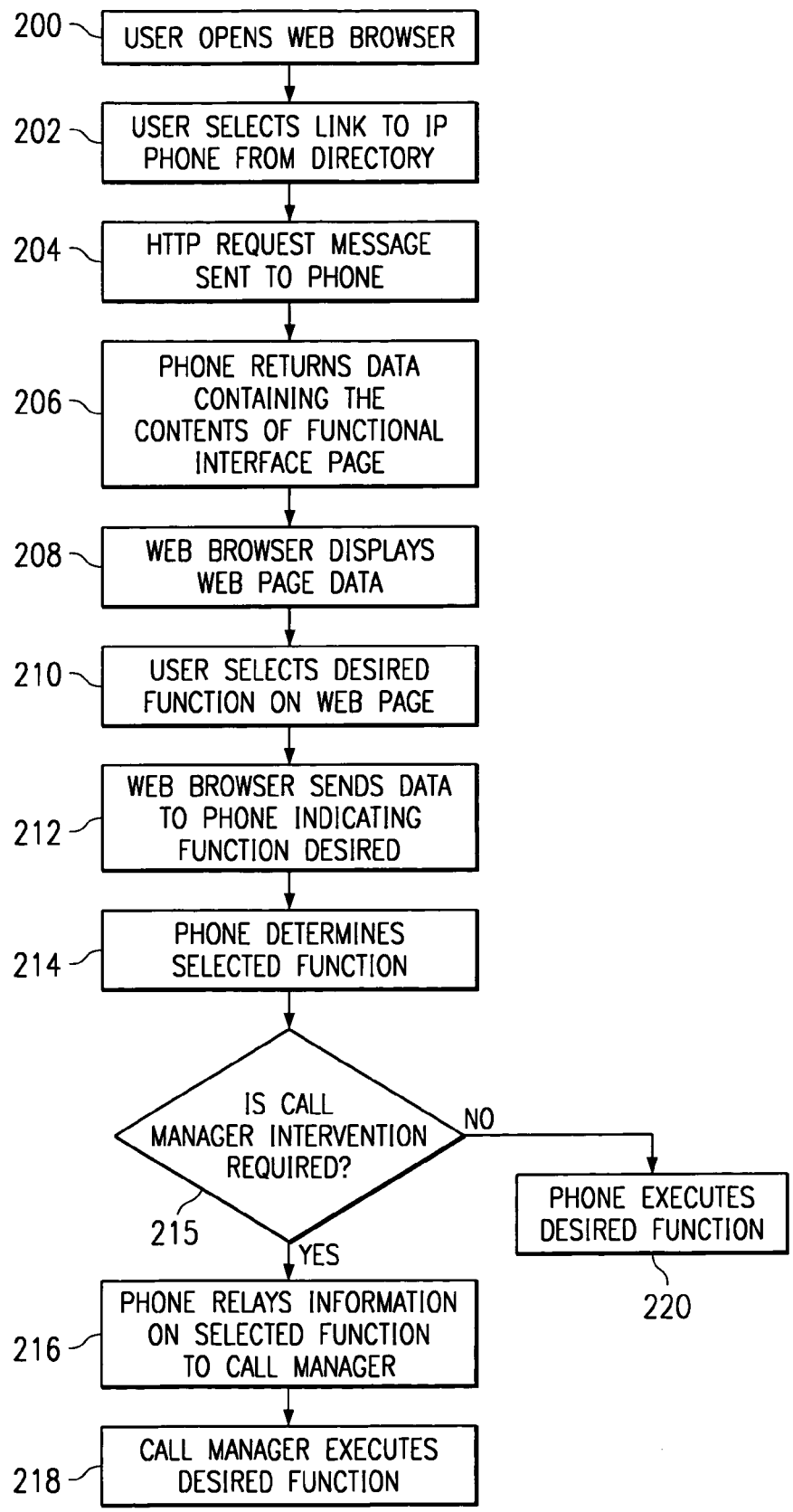
FIG. 4 is a flowchart illustrating an exemplary process in accordance with the present invention by which a user executes a functionality of an IP telephone using the functional interface page of FIG. 3.

FIG. 4 is a flowchart illustrating an exemplary process by which a user executes a functionality of IP phone 22*a* via a Web browser. The user opens, executes or launches a Web browser on a device coupled either directly or indirectly to communications network 10 at step 200. The device may be any network device capable of acting as an HTTP client, such as a personal computer. The user selects a link to IP phone 22*a* from a directory at step 202. In response to the user's input, the Web browser sends an HTTP request message to IP phone 22*a* at step 204. IP phone 22*a* sends back data packets to the Web browser containing the contents of the home (index) page of IP phone 22*a* at step 206. The Web browser displays the home page data (which in the described embodiment is functional interface page 100) at step 208.

The user of IP phone 22*a* selects a telephony function (By "clicking" on one or more buttons displayed in the browser) that the user desires IP phone 22*a* to perform at step 210. The Web browser sends IP phone 22*a* data indicating the user's selection at step 212, and IP phone 22*a* receives this message and determines the desired function at step 214. Since call manager 26 controls many of the functions of IP phone 22*a*, IP phone 22*a* determines whether call manager intervention is required to perform the function at step 215. If intervention is required, IP phone relays a signal to call manager 26 indicating the function to be performed at step 216. The signal relayed in this case may be the same signal relayed by IP phone when the user physically presses one or more buttons on IP phone 22*a*. Once call manager 26 receives the signal, call manager 26 executes the desired functionality. If call manager intervention is not required at step 215, then IP phone executes the selected function at step 220.

Figure 5:
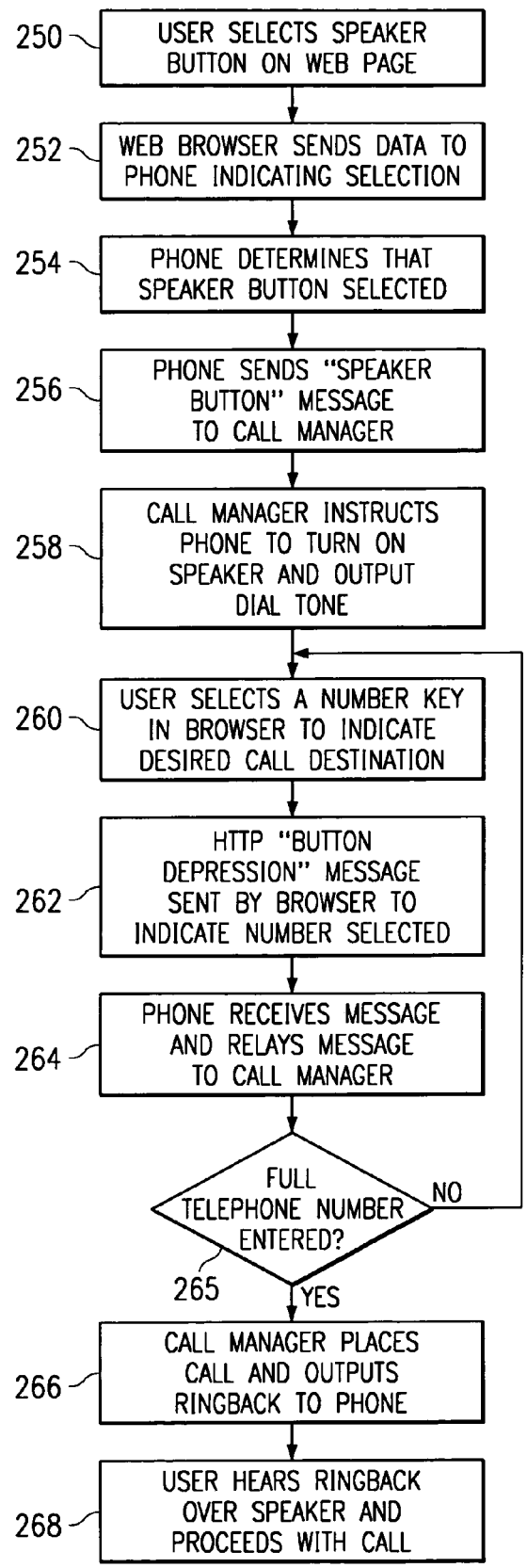
FIG. 5 is flowchart illustrating an exemplary process in accordance with the present invention by which a user places a call on an IP phone using a Web browser.

FIG. 5 illustrates a more specific example of the process illustrated in FIG. 4, where the function that the user desires to perform is placing a call to another phone. The first steps in this process are identical to steps 200-208 of FIG. 4, and are therefore not explicitly shown. Once the browser has displayed the functional interface page for IP phone 22*a*, the user selects the speaker button (or any other button that takes the phone "off-hook") in the browser at step 250. The browser sends data to IP phone 22*a* indicating the user's selection at step 252, and IP phone 22*a* receives this data and determines what function was selected at step 254.

IP phone 22*a* sends a 'Speaker Button' message to call manager 26 indicating the selection of the speaker button at step 256. In response, call manager 26 instructs IP phone 22*a* to turn on its speaker and output a dial tone at step 258. The user then selects the first digit in the telephone number that the user wishes to call by clicking on that number in keypad 102 displayed in the Web browser at step 260. The browser sends an HTTP 'Button Depression' message to IP phone 22*a* indicating which digit was selected at step 262, and IP phone relays this information to call manager 26 at step 264. This process is repeated for each digit entered until the user has entered a full telephone number (such as an extension of another IP phone on LAN 20 or the telephone number of a phone located on PSTN 30). When the full number has been entered and relayed to call manager 26, call manager 26 connects the call and outputs ringback to IP phone 22*a* at step 266. The user hears the ringback over the speaker on IP phone 22*a* and proceeds with the call (i.e., by talking with the called party) at step 268. The user may either continue using the speakerphone or may pick up the handset on the phone.

In addition to providing access to telephony functions of IP phone 22*a*, functional interface 100 (or any other page acting as the index page) also provides HyperText links 108 that allow the user to select a phone configuration page, a user guide page (help pages), or any of a number of different Web pages from Web server 72 of IP phone 22*a*. In addition, links may be provided to other pages available over LAN 20, Internet 40, or WAN 50 (such as the home page of the manufacturer of the phone).

Figure 6:
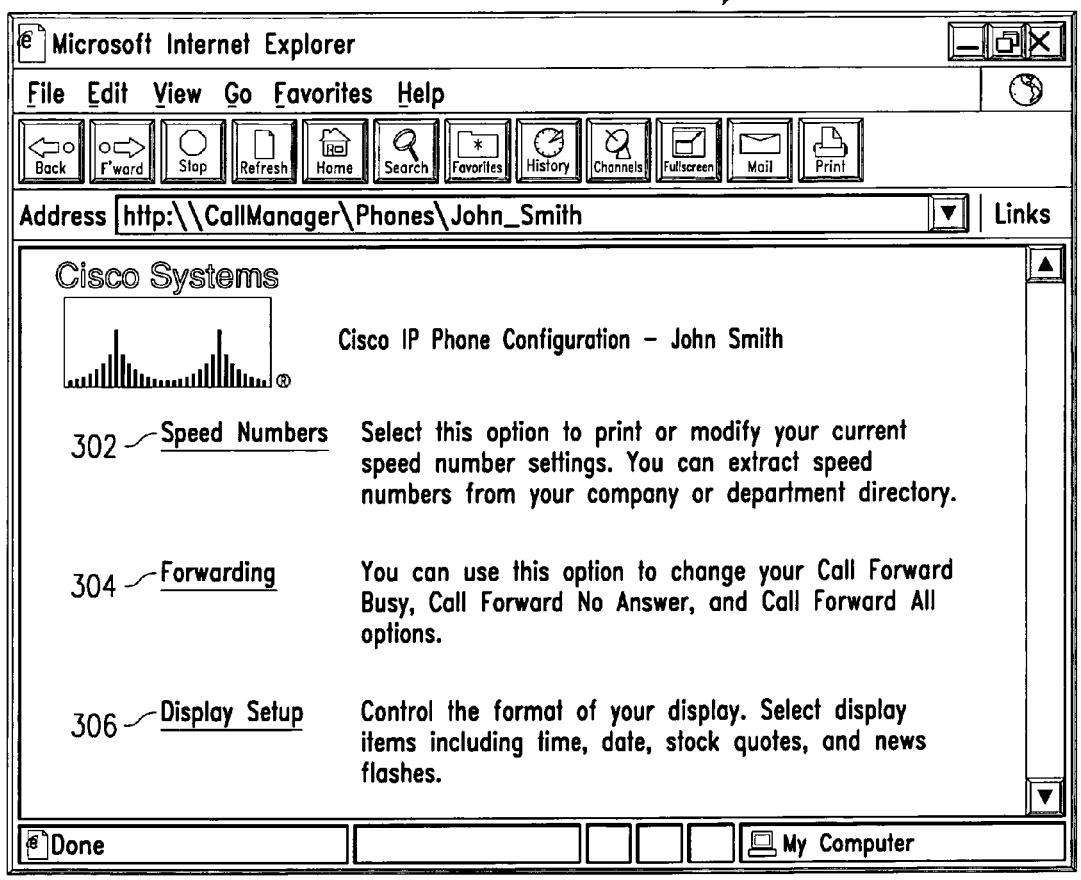
FIG. 6 illustrates an exemplary phone configuration Web page in accordance with the present invention.

Referring to FIG. 6, a phone configuration Web page 300 is illustrated that allows the user to easily perform administrative tasks on the phone. Because of a lack of physical space for configuration buttons on a phone (due to the need to include functional buttons), tasks as simple as setting the date and time may be burdensome when using a traditional phone. Such tasks typically involve locating a manual and following cryptic instructions involving feature codes and numeric key values. But with browser-based configuration page 300, administrative tasks become simple, intuitive and convenient. Few physical space limitations are present in a Web-based environment, and anyone familiar with a browser can easily interface with IP phone 22a to perform administrative functions.

As illustrated in FIG. 6, configuration page 300 has HyperText links that lead to other pages stored in IP phone 22a that are used to configure various aspects of IP phone 22a. For example, selecting a 'Speed Numbers' link 302 will provide a Web page that allows the user to set up the speed dial buttons. This process is described below in conjunction with FIG. 7. Other links such as a 'Forwarding' link 304 and a 'Display Setup' link 306 are also provided on configuration page 300 to allow configuration of other features. It should be understood that although only three administrative options are illustrated in FIG. 6, any administrative function performed with respect to IP phone 22a, such as adjusting ringer, speaker, and headset volumes, may also be included in this or other pages stored in IP phone 22a.

FIG. 7 is a flowchart illustrating a process of configuring a speed dial button on IP phone 22a via a Web browser. The user opens a Web browser on a device coupled either directly or indirectly to IP phone 22a over communications network 10 at a step 400. The device may be any network device capable of acting as an HTTP client, such as a personal computer. The user selects a link to the IP phone from a directory at step 402. In response to the user's input, the Web browser sends an HTTP request message to IP phone 22a at step 404. IP phone 22a sends back data packets to the Web browser containing the contents of the home (index) page of IP phone 22a at step 406. The Web browser displays the home page data at step 408. In further discussion of FIG. 7, it should be assumed, although not explicitly stated, that when the user requests a Web page, the browser sends an HTTP request message to the phone and the phone returns data packets containing the requested page.

The user of the phone selects a link on the home page directed to configuration page 300 (or any type of configuration page) at step 410. The Web browser displays configuration page 300 at step 412, and the user selects the 'Speed Numbers' link at step 414. In response to the user's selection, the browser displays a speed number setup page delivered by IP phone 22a at step 416. This page typically includes a image of IP phone 22a, including the speed dial buttons. The user selects a speed dial button to configure by "clicking" on that button in the browser at step 418. The browser displays a dialog box, and the user enters the phone number to be associated with the selected speed dial button in the dialog box at step 420. The browser sends an HTTP message to IP phone 22a indicating the phone number entered by the user at step 422, and IP phone 22a receives this message and stores the phone number in its memory as associated with the selected speed dial button at step 424.

Figure 8:
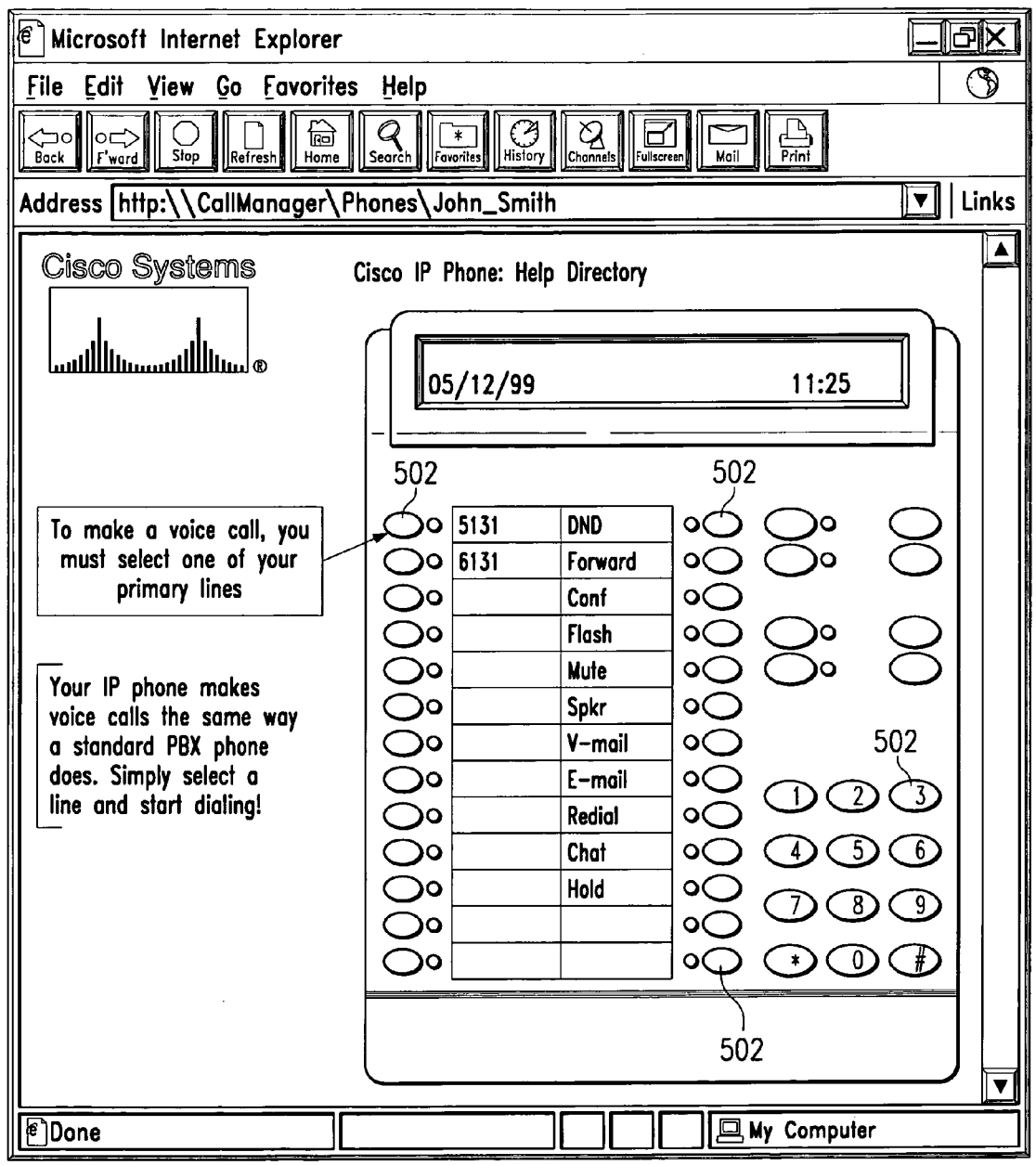
FIG. 8 illustrates an exemplary phone user guide Web page in accordance with the present invention.

In addition to accessing functional interface 100 and configuration page 300, a user may also access a user guide (help pages) from the index page of IP phone 22a. The user guide contains text, images, and animations that help the user use the telephone properly, and it also may include links to other help pages on an external help server. Instead of residing in a separate manual, the user documentation becomes an integral part of the device. Since the user is receiving help information directly from IP phone 22a, the phone is able to provide specific pages in response to a particular problem encountered by the user. For instance, if the user has a problem operating the phone, the user can retrieve the user guide index page on a Web browser. Once the page has been loaded, the user may be given the option of pressing a button on IP phone 22a to receive information on that particular button in the form of a Web page stored in IP phone 22a. Alternatively, as illustrated in FIG. 8, a user can "click" on any button 502 on the representation of IP phone 22a in a help page 500 in order to get the same information.

In addition, help pages may be accessed from a list of topics, a table of contents or an index (as in typical help software included with Microsoft Windows applications). Furthermore, help pages for IP phone 22a may be stored on a external help server located on LAN 20 (such as computer 28), on Internet 40 (such as help repository 44), or over WAN 50 (i.e., on another LAN connected to LAN 20 through WAN 50). The advantage of using an external help server is that a large amount of data storage space is not required on IP phone 22a. When a user requests help information that is not stored in IP phone 22a, the phone simply provides a HyperText link to that information on the external help server. Through the use of external help servers, as well as updates of the content stored in IP phone 22a, the user will always be provided with complete and up-to-date information that is transparently integrated such that all help information seems to be delivered from IP phone 22a.

FIG. 9 is a flowchart illustrating the process of receiving help information in the form of Web pages delivered by IP phone 22a. The user opens a Web browser on a device coupled either directly or indirectly to IP phone 22a on communications network 10 at a step 600. The device may be any network device capable of acting as an HTTP client, such as a personal computer. The user selects a link to the IP phone from a directory at step 602. In response to the user's input, the Web browser sends an HTTP request message to IP phone 22a at step 604. IP phone 22a sends back data packets to the Web browser containing the contents of the home (index) page of IP phone 22a at step 606. The Web browser displays the home page data at step 608. In further discussion of FIG. 7, it should be assumed, although not explicitly stated, that when the user requests a Web page, the Web page is displayed in the browser after the browser sends an HTTP request message to the phone, and the phone returns data packets containing the requested page.

The user of the phone selects a link on the home page directed to the help (user guide) index page at step 610. The Web browser displays the help index page at step 612. The user selects a link to a desired help topic from the help index page (or through a series of links to other Web pages leading to more specific topics) at step 614. Alternatively, the user may depress a particular button on IP phone 22a to receive help on that button. Once the user has selected a help topic, the browser displays a help page (delivered by IP phone 22a) on that topic at step 616.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A telephone for providing content to a client external to the telephone, the telephone and the client each separately coupled to a communications network, the telephone comprising:

a network interface operable to couple the telephone to the communications network;

a handset operable to provide oral communication by a user of the telephone using the network interface;

a memory operable to store communication software and content for delivery to the client using the network interface, the content associated with the operation of the telephone; and a processor coupled to the memory and operable to execute the communication software to enable the telephone to:

receive a request from the client via the network interface for the content stored in the memory;

transmit the content from the telephone to the client via the network interface in response to the request, the content transmitted in a format for presentation in a graphical user interface on the client;

receive a request from the client via the network interface to execute a telephone-related option selected by the user of the client in the graphical user interface; and execute the requested telephone-related option.

2. The telephone of claim 1, wherein the communications network comprises a packet-switched network.

3. The telephone of claim 2, wherein the packet-switched network comprises an Internet Protocol (IP) network.

4. The telephone of claim 1, wherein the network interface comprises an Ethernet interface.

5. The telephone of claim 1, wherein the handset comprises a microphone and speaker dedicated to telephony functions.

6. The telephone of claim 1, wherein the content stored on the memory comprises at least one HyperText Markup Language (HTML) document.

7. The telephone of claim 6, wherein:

the client coupled to the communications network comprises an HTTP client; and the HTML document enables a user of the telephone to remotely execute telephony functions on the telephone via the HTTP client.

8. The telephone of claim 6, wherein:

the client coupled to the communications network comprises an HTTP client; and the HTML document enables a user of the telephone to remotely configure the telephone via the HTTP client.

9. A remote telephone control system, comprising:

an Internet Protocol (IP) network;

a client coupled to the IP network; and a telephone coupled to the IP network, the telephone and the client being each separately coupled to the communications network, the telephone including:

a network interface operable to couple the telephone to the IP network;

a handset operable to provide oral communication by a user of the telephone using the network interface;

a memory operable to store communication software and content for delivery to the client using the network interface, the content associated with the operation of the telephone; and a processor coupled to the memory and operable to execute the communication software to enable the telephone to:

receive a request from the client via the network interface for the content stored in the memory;

transmit the content from the telephone to the client via the network interface in response to the request, the content transmitted in a format for presentation in a graphical user interface on the client;

receive a request from the client via the network interface to execute a telephone-related option selected by the user of the client in the graphical user interface; and execute the requested telephone-related option.

10. The remote telephone control system of claim 9, wherein the client comprises an HTTP client.

11. The remote telephone control system of claim 10, wherein the HTTP client comprises a Web browser.

12. The remote telephone control system of claim 10, wherein the content contained on the memory of the telephone comprises at least one HyperText Markup Language (HTML) document.

13. The remote telephone control system of claim 12, wherein the HTML document allows a user of the telephone to remotely execute telephony functions on the telephone via the HTTP client.

14. The remote telephone control system of claim 12, wherein the HTML document allows a user of the telephone to remotely configure the telephone via the HTTP client.

15. A telephone for providing content to a client, the telephone and the client each separately coupled to a communications network, the telephone comprising:

means for coupling the telephone to the communications network;

means for providing oral communication by a user of the telephone using the network interface;

means for storing communication software and content for delivery to the client using the network interface, the content associated with the operation of the telephone;

means for receiving a request from the client via the network interface for the content stored in the memory;

means for transmitting the content from the telephone to the client via the network interface in response to the request, the content transmitted in a format for presentation in a graphical user interface on the client;

means for receiving a request from the client via the network interface to execute a telephone-related option selected by the user of the client in the graphical user interface; and means for executing the requested telephone-related option.

* * * * *